US009174379B2

(12) United States Patent
Roberts

(10) Patent No.: US 9,174,379 B2
(45) Date of Patent: Nov. 3, 2015

(54) RETAINING DEVICE FOR AN EXTRUDER HOUSING

(71) Applicant: Thermo Electron (Karlsruhe) GmbH, Karlsruhe (DE)

(72) Inventor: Peter Roberts, Stone (GB)

(73) Assignee: Thermo Electron (Karlsruhe) GMBH, Karlsruhe (DE)

( * ) Notice: Subject to any disclaimer, the term of this patent is extended or adjusted under 35 U.S.C. 154(b) by 0 days.

(21) Appl. No.: 14/346,640

(22) PCT Filed: Sep. 21, 2012

(86) PCT No.: PCT/EP2012/003950
§ 371 (c)(1),
(2) Date: Mar. 21, 2014

(87) PCT Pub. No.: WO2013/045060
PCT Pub. Date: Apr. 4, 2013

(65) Prior Publication Data
US 2014/0242209 A1 Aug. 28, 2014

(30) Foreign Application Priority Data
Sep. 30, 2011 (DE) .......................... 10 2011 114 577

(51) Int. Cl.
*B29C 47/66* (2006.01)
*B29C 47/82* (2006.01)
*B29C 47/08* (2006.01)
*B29C 47/38* (2006.01)
*B29C 47/00* (2006.01)
*B29C 47/92* (2006.01)

(52) U.S. Cl.
CPC ......... *B29C 47/0864* (2013.01); *B29C 47/0827* (2013.01); *B29C 47/0847* (2013.01); *B29C 47/38* (2013.01); *B29C 47/66* (2013.01); *B29C47/82* (2013.01); *B29C 47/0009* (2013.01); *B29C 47/0801* (2013.01); *B29C 47/082* (2013.01); *B29C 47/0881* (2013.01); *B29C 47/385* (2013.01); *B29C 47/661* (2013.01); *B29C 47/92* (2013.01)

(58) Field of Classification Search
CPC ............ B29C 47/0801; B29C 47/0803; B29C 47/0805; B29C 47/082; B29C 47/0827; B29C 47/0847; B29C 47/0864; B29C 47/38; B29C 47/385; B29C 47/66; B29C 47/661; B29C 47/82; B29C 47/0881
USPC .......................... 425/188, 192 R, 205, 378.1
See application file for complete search history.

(56) References Cited

U.S. PATENT DOCUMENTS

| 2,683,895 A * | 7/1954 | Scofield .................... 425/192 R |
| 3,696,736 A | 10/1972 | Studli |
| 5,738,884 A * | 4/1998 | Sato .............................. 425/197 |
| 7,473,087 B2 * | 1/2009 | Steiner .......................... 425/135 |
| 2011/0063939 A1 | 3/2011 | Padmanabhan |
| 2011/0070324 A1 * | 3/2011 | Padmanabhan et al. .. 425/192 R |

FOREIGN PATENT DOCUMENTS

| DE | 2115702 A1 | 10/1971 |
| DE | 102010027662 | 1/2012 |
| DE | 102010027663 | 1/2012 |
| EP | 1762362 A2 | 11/2011 |
| EP | 1627723 B1 | 12/2013 |
| JP | 57193518 | 11/1982 |
| JP | 60203400 | 10/1985 |
| JP | 6297540 | 10/1994 |
| JP | 2001150509 | 6/2001 |
| JP | 2009292103 | 12/2009 |
| KR | 100877595 B1 | 1/2009 |

* cited by examiner

Primary Examiner — Yogendra Gupta
Assistant Examiner — Joseph Leyson
(74) Attorney, Agent, or Firm — William R. McCarthy, III

(57) ABSTRACT

The invention relates to an extruder which has an extruder housing. The housing has at least two housing parts and is provided with a delivery channel in order to extrude a medium, at least one screw conveyor being located in said channel. The extruder housing is releasably retained on a frame by means of a first retaining device and a shaft section of the screw conveyor is releasably connected to a drive device. According to the invention the housing parts are fixed relative to one another by means of a second retaining device and the extruder housing is connected to the frame and secured against displacement in the longitudinal direction of the extruder housing by means of a third retaining device. When the first and third retaining device) are released, the housing parts can be removed as a unit from the frame.

11 Claims, 3 Drawing Sheets

RETAINING DEVICE FOR AN EXTRUDER HOUSING

Figure 1:
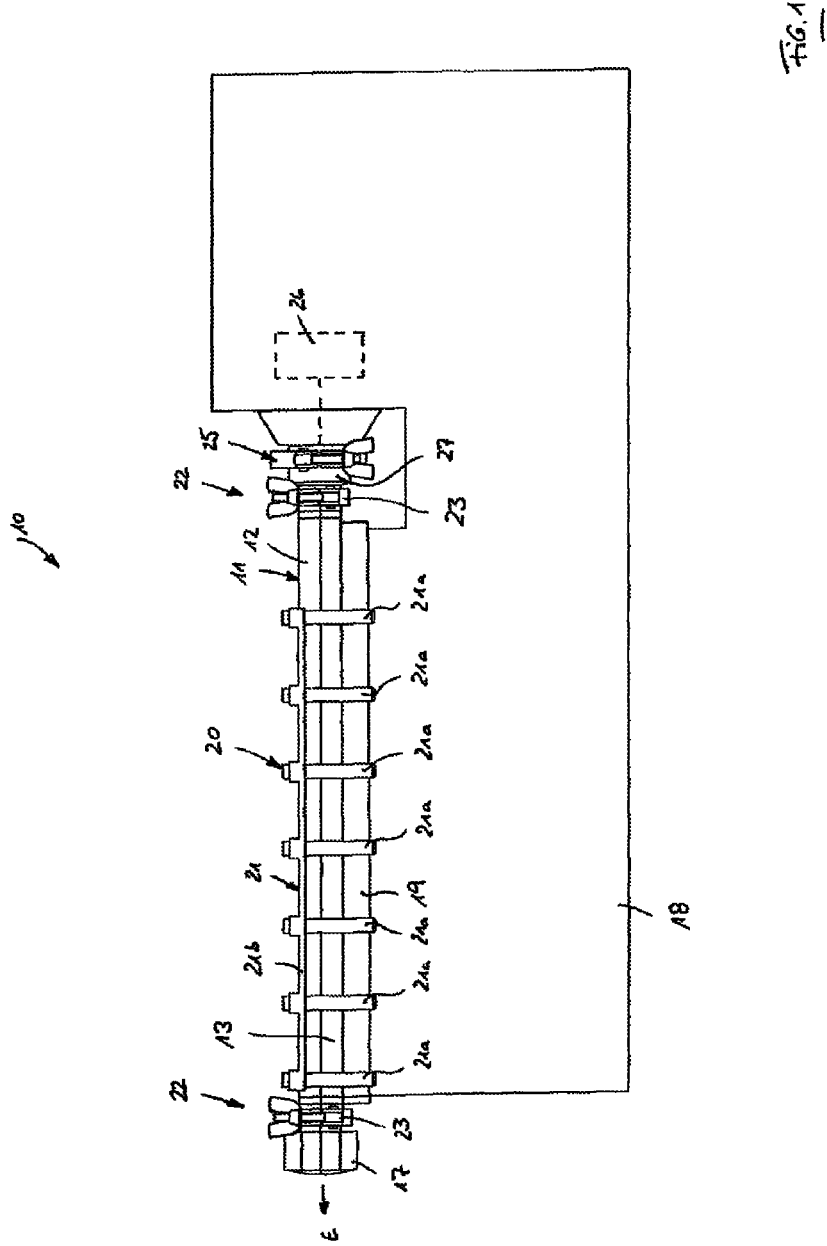

The invention relates to an extruder comprising an extruder housing having at least two housing parts and in which is configured, for the extrusion of a medium, a feed channel, in which at least one screw conveyor is disposed, wherein the extruder housing is held detachably on a stand by means of a first retaining device and the screw conveyor is detachably connected in a shaft section to a drive device.

An extruder is a conveying device which by means of a screw conveyor presses a solid, liquid or powdery medium, in particular under pressure and at high temperature, out of a shaping opening. In this context, a distinction can be drawn between processing extruders and compounding extruders. A processing extruder is used substantially for shaping, while a compounding extruder is used for chemical and/or physical modification, for example for the mixing, degasification or investigation of substances. According to the invention, both types of extruders should be jointly included.

An extruder possesses an extruder housing, in which a mixing or feed channel for the medium to be conveyed and extruded is configured. In the feed channel is disposed, in a tight fit, at least one screw conveyor, which is rotationally driven, whereby the medium is transported along the feed channel. An extruder can comprise one, two or even more screw conveyors, which, depending on the nature of the medium and of the conveyance, are driven either in the same direction or in opposite directions.

The extruder housing is usually constructed from a plurality of housing parts. From DE 10 2010 027 662 A1, it is known to divide the extruder housing horizontally into at least one housing top part and at least one housing bottom part. Alternatively, it is also known, however, to divide the extruder housing vertically, so that then at least one right housing part and at least one left housing part are present. Below, by way of example, a horizontal division of the extruder housing shall be assumed, though the invention is not limited thereto.

If the medium to be extruded or processed is changed, it is necessary to disassemble the extruder housing and to clean the components. For this purpose, the housing top part is firstly released and removed from the housing bottom part, whereupon the screw conveyor can be taken out. Next the housing bottom part, which is usually bolted to an underlying stand, is released, so that it can likewise be removed. The components are then cleaned and can subsequently be reassembled.

A drawback with this procedure is that the extruder is idle for a relatively long time when a product is changed, which is uneconomical.

There is the danger, furthermore, that, when the extruder is disassembled, product remnants find their way into the environment, which, particularly where the extruder is used in a clean room in production in the pharmaceutical industry, is unacceptable.

EP 1 627 723 A2 discloses an extruder in which the extruder housing is seated on a stand-like carrier, which is removable from a substructure. On the carrier are additionally arranged all necessary coolant, power and control lines, which are accommodated in an appropriate housing box seated on the carrier. The carrier forms together with the extruder housing and the housing box, as well as with all the lines, an exchangeable module, which can be removed. Associated with this embodiment is the drawback, however, that the extruder housing, for cleaning, must firstly be detached from the carrier, since there is the danger of the relatively sensitive lines being damaged when the module as a whole is cleaned.

The object of the invention is to provide an extruder of the stated type, which, when a product is changed, is quickly functional again and in which a cleaning can be quickly and easily conducted.

This object is achieved according to the invention by an extruder having the features of claim 1. It is here provided that the housing parts are fixed relative to one another by means of a second retaining device, that the extruder housing is connected to the stand by means of a third retaining device and is secured against displacement in the longitudinal direction of the extruder housing, and that the housing parts can be removed as a unit from the stand once the first and third retaining device are released.

According to the invention, the basic rationale is to hold the extruder housing by means of 3 separate retaining devices. In addition to the first retaining device, which holds the extruder housing in place on the stand, there is provided an additional, second retaining device, which fixes the housing parts relative to one another. In addition, the extruder housing is connected to the stand by means of a third retaining device and is secured against displacement in the longitudinal direction of the extruder housing.

The first retaining device serves to clamp the extruder housing, perpendicular to its longitudinal extent, onto the underlying stand from above. The third retaining device secures the extruder housing in its longitudinal direction. Due to this division of the holding functions, the retaining devices can be configured in very simple design, for example as simple clamps or clips.

If the first retaining device and the third retaining device are released in the event of a change of product, the extruder housing comes free from the underlying stand. The housing parts here remain fixed relative to one another, however, by means of the second retaining device, so that the extruder housing is removed as a unit and is further treated preferably in an adjoining room. Since the extruder housing thus constitutes an independent construction module, a new extruder housing, which likewise constitutes a corresponding construction module, can thus be installed in the extruder. The downtime of the extruder can thereby be substantially reduced.

In the worst case scenario, it is possible for the screw conveyor to be pulled out of the removed extruder housing, or to fall out of the same, before the mutual fixing of the two housing parts by means of the second retaining device is released. In order to reliably prevent this, in a refinement of the invention it is provided that the screw conveyor is restricted in its axial motion within the feed channel by means of a locking part and is prevented from falling out. In order to take the screw conveyor out of the extruder housing, either the locking part must be removed by the user, and/or the second retaining device, and thus the mutual fixing of the housing parts, must firstly be released and the housing parts must be separated from one another in order to have access to the screw conveyor.

In dependence on the nature of the material to be processed, it is necessary to cool and/or heat, i.e. to control the temperature of, the extruder housing, wherein the temperature control can usually be realized in various sections, situated axially one behind the other, of the extruder housing, individually and independently from one another. In a preferred embodiment of the invention, it is provided that a cooling and/or heating device is attached to the stand beneath the extruder housing, and that the extruder housing is mounted on the cooling and/or heating device and is held on this by means of the first retaining device. Associated with this embodiment is the fundamental advantage that the extruder housing, after the release of the first retaining device, can be removed from the cooling and/or heating device without lines having to be removed or detached. In this way, a very rapid change of the extruder housing is achievable. A further fundamental advantage of this embodiment lies in the fact that no sensitive components of the heating or cooling device, or the sensors or control system thereof, are disposed directly on the extruder housing, but rather the extruder housing consists only of metal parts, which can be easily cleaned by mechanical and/or thermal means without risk of damage.

The first retaining device is preferably constituted by a plurality of clamping units, with which the extruder housing is clamped against the stand or the cooling and/or heating device attached to the stand. Appropriate clamping units can be rapidly fitted and rapidly released, so that the detachment of the extruder housing and the installation of a new extruder housing requires only a short length of time.

In a preferred embodiment of the invention, it is provided that the second retaining device comprises a plurality of retaining units, which are spaced apart in the longitudinal direction of the extruder housing and which can likewise be constituted by clamps.

The material to be extruded is fed in the rear region of the extruder housing to the feed channel and conveyed by means of the screw conveyor along the feed channel to the front end of the latter, where it is discharged at a die which is disposed there and which can be detachably fastened to the extruder housing. When a product is changed, the die must also be exchanged and, where necessary, cleaned, since the previously extruded material is still present in the die channel of the die. For this reason, it is advantageous if the die can be removed together with the extruder housing as a unit. A particularly simple attachment of the die is obtained if this, in a refinement of the invention, is fastened to the extruder housing by means of one of the retaining units of the second retaining device.

A coupling part can be fastened, preferably detachably, to the rear end of the extruder housing, which coupling part can serve, for example, to couple the extruder housing to the housing of the drive device. In a preferred embodiment of the invention, it is provided that the coupling part is fastened to the extruder housing by means of one of the retaining units of the second retaining device and can thus be removed from the stand together with said extruder housing as a unit. At the same time, the coupling part can serve to prevent a discharge of material, present in the feed channel, at the rear end of the extruder housing. Alternatively or additionally thereto, the coupling part can also serve as a locking part, which prevents the screw conveyor from falling out of the feed channel.

The screw conveyor is detachably connected at its rear end to the rotationally driven output shaft of the drive device. In a preferred embodiment of the invention, it is provided that the screw conveyor is plug-connected with its shaft section to the output shaft of the drive device, i.e. is loosely plugged in only in the axial direction, wherein a rotary motion or a torque can be transmitted, however, between the output shaft of the drive device and the shaft section. The third retaining device can here be disposed in the region of the shaft section of the screw conveyor and preferably operates between the coupling part and the stand.

Figure 2:
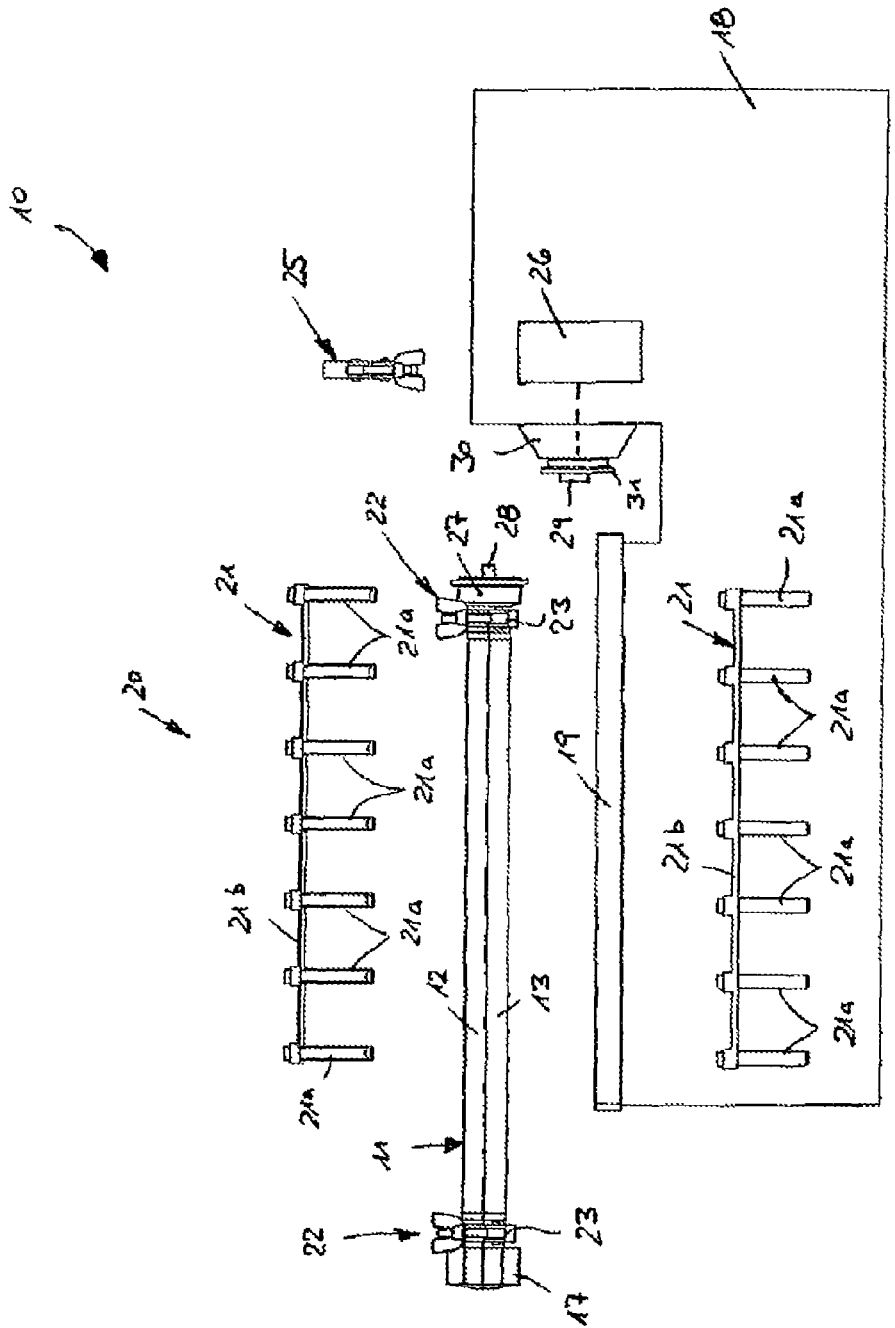
Figure 3:
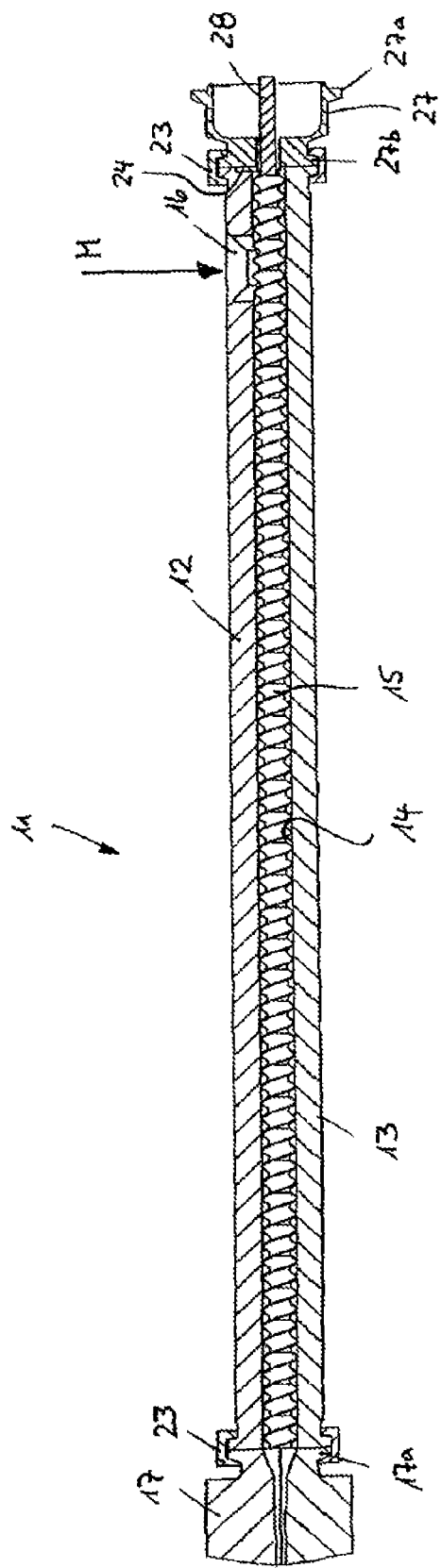

Further details and features of the invention can be seen from the following description of an illustrative embodiment with reference to the drawing, wherein:

FIG. 1 shows a schematic side view of an extruder, with mounted extruder housing, FIG. 2 shows an exploded representation of the components of the extruder according to FIG. 1, the extruder housing having been removed, and FIG. 3 shows a vertical section through the removed extruder housing.

In the figures is shown an extruder 10, which has a housing-like stand 18, on which a substantially horizontally extending cooling and/or heating device 19 is fitted. Alongside the cooling and/or heating device 19 is disposed, in the stand 18, a drive device 26 (not represented in detail), which has an output shaft 29 protruding on a frustoconical housing part 30. In the region of the output shaft 29, a circumferential flange 31 is configured on the housing part 30.

According to FIG. 3, an extruder housing 11 comprises a housing top part 12 and a housing bottom part 13, between which a feed channel 14 is configured. In the feed channel 14 is disposed a screw conveyor 15, which has a shaft section 28 protruding at the rear end of the extruder housing 11 and engageable with the output shaft 29 of the drive device 26. The housing top part 12 possesses in the rear region of the screw conveyor 15 a fill opening 16, through which a material can be fed, as is indicated by the arrow M. The material is transported along the feed channel 14 by rotation of the screw conveyor 15 and is discharged at the front end of said feed channel at a die 17.

At the rear end of the extruder housing 11 is disposed a coupling part 27, which surrounds the shaft section 28 of the screw conveyor 15 in the manner of a housing and has at its rear end a circumferential flange 27a, which can be brought into contact with the flange 31 of the housing part 30. The coupling part 27 is designed such that by positive locking it prevents the screw conveyor 15 from being able to fall rearward out of the feed channel 14. In addition, on the housing top part 12 is disposed a locking part 24, which likewise prevents the screw conveyor 15 from falling axially out of the feed channel 14 if the coupling part 27 is detached.

Said components are connected to one another by means of a second retaining device 22. In the represented illustrative embodiment, the second retaining device 22 comprises two retaining units 23, which are formed as clamps. A front first retaining unit 23 of the second retaining device 22 embraces the front end of the housing top part 12, the front end of the housing bottom part 13 and a circumferential flange 17a configured on the die 17. In this way, both the two housing parts 12 and 13 are clamped one against the other and the die 17 is held securely on the front end of the extruder housing 11.

A rear second retaining unit 23 of the second retaining device 22 embraces the rear end of the housing top part 12, the rear end of the housing bottom part 13 and a retaining flange 27b configured on the coupling part 27. By means of the rear retaining unit 23, the housing parts 11 and 12 are clamped one against the other and, moreover, the coupling part 27 is fixedly connected to the extruder housing 11. As FIGS. 2 and 3 show, the two housing parts 12 and 13 form together with the die 17, the coupling part 27 and the inserted screw conveyor 15 a modular structural unit, which can be removed and changed over. This structural unit is fitted to the extruder 10, in that the extruder housing 11 is placed with the housing bottom part 13 onto the cooling and/or retaining device 19 of the stand 18. There is then fitted a first retaining device 20, with which the extruder housing 11 is clamped onto the cooling and/or heating device 19, and thus the stand 18. In the represented illustrative embodiment, the first retaining device 20 comprises two retaining units 21, each retaining unit 21 consisting of a strip-shaped carrier 21b, on which clamps 21a are held at a distance apart one behind another. The clamps 21a are mounted in such a way on the side of the extruder housing 11 and the underlying cooling and/or heating device 19, and then tightened, so that the extruder housing 11 is held securely on the stand 18 or the cooling and/or heating device 19 and the latter is thermally contacted.

The shaft section 28 of the screw conveyor 15 is plugged into the output shaft 29 of the drive device 26 and, where necessary, can also be fastened in said output shaft. Next, a third retaining device 25 in the form of a clamp is mounted onto the flange 31 of the housing part 30 and onto the flange 27a of the coupling part 27 and tightened, whereby the coupling part 27 is fixedly connected to the housing part 30, and thus to the stand 18. In this way, the extruder housing 11 is prevented from possibly shifting relative to the stand 18 in the longitudinal direction of the screw conveyor 15.

In order to exchange the extruder housing 11 in the event of a change of material, the two retaining units 21 of the first retaining device 20 are firstly released and pulled off laterally. After this, the third retaining device 25 is released, so that the module consisting of the two housing parts 11 and 12, the die 17, the coupling part 27 and the screw conveyor 15 can be removed from the extruder, as is represented in FIG. 2. The die 17 and the coupling part 27 here prevent material from being possibly discharged from the extruder housing 11 into the environment. Said module can then be opened and cleaned in an adjoining room. In the meantime, a new module can be inserted into the extruder and the latter can be operated with another material. Since the module possesses no components of the cooling or heating device, of the sensors or control system necessary for this, but consists only of metal parts, it can be cleaned very rapidly and effectively without risk of damage to components.

The invention claimed is:

1. An extruder comprising
   an extruder housing mounted on a cooling and/or heating device and held detachably on a stand by a first retaining device, wherein the extruder housing has two housing parts fixed relative to one another by a second retaining device and is configured to extrude a medium; and
   a feed channel comprising a screw conveyor disposed therein;
   wherein the cooling and/or heating device is attached to the stand beneath the extruder housing, the extruder housing is connected to the stand by a third retaining device that secures against displacement in the longitudinal direction of the extruder housing, the screw conveyor is detachably connected at a shaft section to a drive device, and wherein the housing parts can be removed as a unit from the stand once the first and third retaining devices are released.

2. The extruder as claimed in claim 1, wherein the screw conveyor is restricted in its axial motion within the feed channel by a locking part and is prevented from falling out.

3. The extruder as claimed in claim 1, wherein the second retaining device has a plurality of retaining units, which are spaced apart in the longitudinal direction of the extruder housing.

4. The extruder as claimed in claim 3, wherein the retaining units are clamps.

5. The extruder as claimed in claim 1, wherein a die is detachably fastened to the front end of the extruder housing.

6. The extruder as claimed in claim 5, wherein the die is fastened to the extruder housing by one of a plurality of retaining units of the second retaining device.

7. The extruder as claimed in claim 1, wherein a coupling part is detachably fastened to the rear end of the extruder housing.

8. The extruder as claimed in claim 7, wherein the coupling part is fastened to the extruder housing by one of a plurality of retaining units of the second retaining device.

9. The extruder as claimed in claim 1, wherein the screw conveyor is plug-connected with its shaft section to an output shaft of the drive device.

10. The extruder as claimed in claim 1, wherein the third retaining device is disposed in the region of the shaft section of the screw conveyor.

11. The extruder as claimed in claim 7, wherein the third retaining device operates between the coupling part and the stand.

\* \* \* \* \*